United States Patent Office 3,472,935
Patented Oct. 14, 1969

3,472,935
NEMATOCIDAL METHOD AND COMPOSITION CONTAINING 2-DIHALOMETHYLBENZOTHIAZOLES
David T. Manning, South Charleston, W. Va., and Anthony A. Sousa, Raleigh, N.C., assignors to Union Carbide Corporation, a corporation of New York
No Drawing. Original application Aug. 5, 1964, Ser. No. 387,789. Divided and this application Aug. 1, 1967, Ser. No. 657,519
Int. Cl. A01n 9/12; C07d 91/44
U.S. Cl. 424—270        2 Claims

ABSTRACT OF THE DISCLOSURE 2-dihalomethylbenzothiazoles, especially the 2-dichloro compounds, are claimed as pesticides, particularly as nematocides.

---

This is a division of application Ser. No. 387,789, filed Aug. 5, 1964, now abandoned.

This invention relates to novel 2-dihalomethylbenzothiazoles, and to a novel method for their preparation. In a particular aspect, this invention is concerned with pesticidally-active 2-dichloromethylbenzothiazoles, and a novel method for their preparation from the corresponding 2-trichloromethylbenzothiazolines.

Pesticidally-active benzothiazoles are known in which the number 2-position of the benzothiazole nucleus is directly attached to sulfur, nitrogen, oxygen or to a halogen-containing aryl radical. However, a search of the art has failed to reveal any prior preparation of 2-dihalomethylbenzothiazoles within this invention wherein the number 2-position of the benzothiazole nucleus is directly attached to a dihalomethyl group.

Y. Mizuno et al., J. Pharm. Soc. Japan, vol. 72, 1263 (1952) report work on the chlorination of 2-methylbenzothiazole to 2-trichloromethylbenzothiazole, but state that they were unable to detect or prepare any 2-chloromethylbenzothiazole or 2-dichloromethylbenzothiazole in their reaction mixtures. The only product whose presence Mizuno et al. could demonstrate was 2-trichloromethylbenzothiazole. Mizuno et al. did not prepare any 2-dichloromethylbenzothiazoles. Mizuno et al. also prepared the 6-nitro analog of 2-trichloromethylbenzothiazole, and chlorinated 2-ethylbenzothiazole and 2-ethyl-6-nitrobenzothiazole to produce, respectively 2-(1,1-dichloroethyl)-benzothiazole and 2-(1,1-dichloroethyl)-6-nitrobenzothiazole.

Some 2-substituted monohaloalkyl and trihaloalkenyl benzothiazoles have also been reported in the literature. They include 2-chloromethylbenzothiazole, 2-bromomethylbenzothiazole, 2-chloromethyl-6-nitrozenzothiazole, 2-(2-bromoethyl)benzothiazole, and 2-(1,1,1-trichloropropenyl)benzothiazole. But again, no 2-dihalomethylbenzothiazoles were reported as being prepared.

Accordingly, an object of this invention is to provide new and useful 2-dihalomethylbenzothiazoles. Another object is to provide 2-dihalomethylbenzothiazoles which find particular application in combating microorganisms, such as bacteria and fungi. A still further specific object is to provide 2-dichloromethylbenzothiazoles which possess activity against microorganisms which adversely affect plant life. Another object is to provide nematocidally-active 2-dichloromethylbenzothiazoles. A still further object is to provide a novel process for the preparation of 2-dichloromethylbenzothiazoles from their corresponding 2-trichloromethylbenzothiazolines by a heretofore unknown dehydrochlorination reaction. Another object is to provide for the novel dehydrochlorination of 2-trichloromethylbenzothiazolines to their corresponding 2-dichloromethylbenzothiazoles. A still further object is to provide a method for combating microorganisms which adversely affect plant life which comprises subjecting the microorganisms to the action of a microbiocidally effective amount of 2-dihalomethylbenzothiazoles. These and other objects of this invention will readily become apparent to those skilled in the art to which this invention pertains from the ensuing description thereof.

The 2-dihalomethylbenzothiazoles of this invention can be represented by Formula I.

(I)

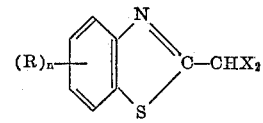

wherein R can be hydrogen, halogen, nitro, trihalomethyl, alkyl, alkenyl, alkoxy, aryloxy, alkylthio, arylthio, cyano, hydroxy, mercapto, carboxy, carbamol, N-alklcarbamoyl, N-arylcarbamoyl, thiocarbamoyl, amino, alkylamino, arylamino, acylamido, aroylamido, acyloxy, aroyloxy, alkoxycarbonyl, aryloxycarbonyl, alkylthiocarbonyl, arylthiocarbonyl, alkoxysulfinyl, aryloxysulfinyl, alkylsulfonyl, arylsulfonyl, acyl, sulfo, sulfamyl, aryl, aroyl, and the like groups; X is halogen; and $n$ is an integer of from 0 to 4, inclusive, with the proviso of only one R on each ring carbon atom when R is other than hydrogen.

It can be seen from Formula I that two classes of structural modifications can be made in the 2-dihalomethylbenzothiazoles of this invention: (1) in the 2-dihalomethyl group —$CHX_2$; and (2) in the benzene ring portion

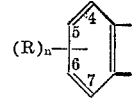

The 2-dihalomethyl group can be —$CHCl_2$, —$CHBr_2$, —$CHF_2$, or —$CHI_2$, as well as various combinations and permutations of different halogens such as

—CHCLBr and —CHBrI. Substitution on the benzene ring portion can occur at none, one or all of the positions 4, 5, 6, and 7, with only one R on each ring carbon atom when R is other than hydrogen.

With reference to Formula I, preferred R substituents on the benzene ring portion, with only one R on each ring carbon atom when R is other than hydrogen, and preferred limitations therefor, are: —H, —Cl, —Br, —F, and —I with a maximum of two —I atoms, three —F atoms, three —Br atoms and four —Cl atoms; —$NO_2$ with a maximum of two; trihalomethyl wherein trihalomethyl is $Cl_3C$—, $F_3C$—, and $Br_3C$— with a maximum of one; alkyl of from one to twelve carbon atoms with a maximum of three alkyl groups; alkenyl of from two to twelve carbon atoms with a maximum of two alkenyl groups; alkoxy, aryloxy and their sulfur analogs, alkylthio, and arylthio, with a total carbon content of from one to eight carbon atoms and a maximum of any two of such groups; —CN, —COOH, and —$CONH_2$, with a maximum of two of these groups; —$NH_2$; acylamido

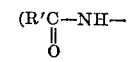

wherein R' is alkyl of from one to eight carbon atoms); aroylamido

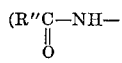

wherein R" is aryl with a total carbon content of from six to ten carbon atoms) with a maximum of two groups; acyloxy

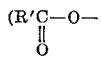

wherein R' is alkyl of from one to eight carbon atoms); aroyloxy

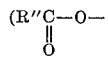

wherein R" is aryl with a total carbon content of from six to ten carbon atoms); alkoxycarbonyl

wherein R' is alkyl of from one to eight carbon atoms) aryloxycarbonyl

wherein R" is aryl with a total carbon content of from six to ten carbon atoms) and sulfur analogs alkylthiocarbonyl

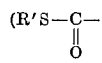

wherein R' is alkyl of from one to eight carbon atoms), arylthiocarbonyl

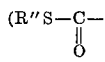

wherein R" is aryl with a total carbon content of from six to ten carbon atoms), alkoxysulfinyl

wherein R' is alkyl of from one to eight carbon atoms), aryloxysulfinyl

wherein R" is aryl with a total carbon content of from six to ten carbon atoms) with a maximum of two such groups; alkylsulfonyl

wherein R' is alkyl of from one to eight carbon atoms); arylsulfonyl

wherein R" is aryl with a total of six to ten carbon atoms); acyl

wherein R' is hydrogen or alkyl of from one to eight carbon atoms); sulfo ($HO_3S$—); sulfamyl ($H_2NO_2S$—); and aroyl

wherein R" is aryl with a total carbon content of from six to ten carbon atoms) with a maximum of two such groups.

The preferred 2-dihalomethylbenzothiazoles of this invention are the 2-dichloromethylbenzothiazoles which can be represented by Formula II:

(II)

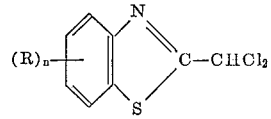

wherein R represents any of the preferred R substituents on the benzene ring portion shown hereinabove with reference to the R's preferred in Formula I; and $n$ is an integer of from 0 to 4, inclusive, as noted hereinabove.

Particularly preferred 2-dichloromethylbenzothiazoles are those represented by Formula III:

(III)

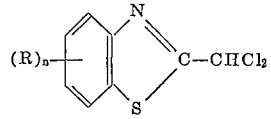

wherein R is hydrogen, 1 or 2 nitro groups, 1 or 2 chlorine atoms, and 1 trihalomethyl group (wherein halo is chloro, fluoro, or bromo).

The 2-dihalomethylbenzothiazoles of this invention can be prepared by one or more methods.

The most general method involves the reaction of a 2-aminobenzenethiol with an acid halide, or their corresponding carboxylic acids, esters or anhydrides. This method can be illustrated by reaction scheme (A):

(A)

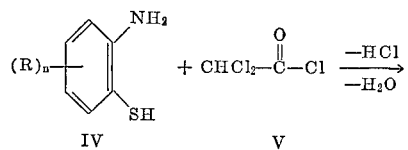

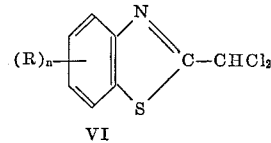

wherein R and $n$ have all of the aforementioned significance ascribed thereto with reference to Formulae I, II, and III. In reaction scheme (A), a 2-aminobenzenethiol (IV) is reacted with dichloroacetyl chloride (V) with the evolution of hydrochloric acid and water to give the corresponding 2-dichloromethylbenzothiazole (VI). If desired, a base can be used to remove by-product hydrochloric acid. This general method for the preparation of benzothiazoles is well-known. See, "Heterocyclic Compounds," vol. 5, R. C. Elderfield, Wiley, New York (1957).

A second method is useful in the preparation of the 2-dichloromethylbenzothiazoles of this invention and is a novel method which involves a heretofore unknown dehydrochlorination reaction. In this method, a 2-trichloromethylbenzothiazoline is dehydrochlorinated to give the corresponding 2-dichloromethylbenzothiazole. This second method can be illustrated by reaction scheme (B):

(B)

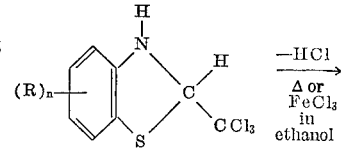

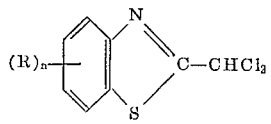

wherein R and $n$ have all of the aforementioned significance ascribed thereto with reference to Formulae I, II, III, and IV. In reaction scheme (B), a 2-trichloromethylbenzothiazoline (VII) is dehydrochlorinated to give the corresponding 2-dichloromethylbenzothiazole (VI). Elimination of hydrogen chloride to give the desired product (VI) can be effected by heating (pyrolysis), or by treatment with a metal halide such as ferric chloride in a solvent such as alcohol, that is, ethanolic-ferric chloride.

The precursor 2-trichloromethylbenzothiazolines (VII), and their preparation, form the basis for (now abandoned) copending application Ser. No. 431,198, filed Feb. 8, 1965, and incorporated herein by reference. In general, the 2-trichloromethylbenzothiazoline precursors can be prepared by reacting the appropriate 2-aminobenzethiol with chloral. For example, 2-trichloromethylbenzothiazolines can be prepared by reacting o-aminobenzethiols with chloral.

In the dehydrochlorination reaction, the following conditions should prevail. The metal halide may be the Lewis acid-type metal halides ($FeCl_3$, $AlCl_3$, $NnCl_2$, $SnCl_4$ and other known Lewis acid-type metal halides), and is preferably ferric bromide or ferric chloride, especially ferric chloride. Preferably the ferric chloride is in ethanol, that is, ethanolic-ferric chloride. The mole ratio of reactants, that is, metal halide to 2-trichlorobenzothiazoline, can be 0.001 to 20, with 1.0 to 5.0 preferred, and 2.4 most preferred. The dehydrochlorination method employed herein can be performed either by heat (pyrolysis) or by a metal halide such as the Lewis acid-type metal halide, ferric chloride. The temperature using heat (thermal dehydrochloroination), depends on the particular 2-trichloromethylbenzothiazoline. The lower temperature limit depends upon the minimum decomposition temperature of the individual 2-trichloromethylbenzothiazoline. A temperature of from about 25° to about 250° C. is deemed operative, with a preferred temperature range of from about 100° to about 160° C., and a most preferred temperature range of from about 110° to about 130° C. The temperature using a metal halide such as ferric chloride (metal halide dehydrochlorination) can vary from about 10° to about 150° C., with from about 25° to about 100° C. preferred, and from about 40° to about 70° C. most preferred. Pressure does not appear to be critical or have any adverse effect on the dehydrochlorination reaction. The reaction time (contact time) for thermal dehydrochlorination can vary from about 0.001 to 20 hours, with from about 0.3 to about 10.0 hours preferred, and from about 0.5 to 5.0 hours most preferred. The reaction time for metal halide dehydrochlorination such as with ferric chloride can vary from about 0.1 to 10 hours, with from about 0.2 to about 5.0 hours preferred, and from about 0.5 to about 2.0 hours most preferred. Solvents employed in the metal halide dehydrochlorination are not restrictive and can be any of the usual solvents such as the lower alcohols, that is, lower alkanols of from 1 to 8 carbon atoms such as methanol, ethanol, propanol, isopropanol, butanol, tert-butanol, pentanol, and the like, with ethanol most preferred. Any solvent except water and amines for ferric halides is suitable. Solvents employed in the thermal dehydrochlorination can be, for example, aliphatic and aromatic hydrocarbons and chlorinated hydrocarbons; pyridines and other amines are to be avoided. Thermal dehydrochlorination can be performed without any solvent, or in any inert solvent. The reactor is preferably made up of materials which resist strong acids such as hydrochloric acid and halogenated hydrocarbons such as chlorinated hydrocarbons. The reaction can be carried out in a batch-wise or continuous manner.

Elimination of hydrogen chloride from 2-trichloromethylbenzothiazolines, either by thermolysis or by ferric halide is novel. In fact, the ferric chloride reaction is most unexpected since the expected reaction of ferric chloride with benzothiazolines is simple oxidation (loss of two hydrogen atoms) to the corresponding benzothiazole. The fact that the dimer of 2-trichloromethylbenzothiazoline also undergoes pyrolysis is important in that crude 2-trichloromethylbenzothiazolines need not be freed of dimer in order to serve as a source of 2-dichloromethylbenzothiazole by pyrolysis.

The following examples illustrate the 2-dihalomethylbenzothiazoles of this invention and the preparation thereof.

EXAMPLE 1

2-dichloromethylbenzothiazole

A solution of 25.5 g. (0.10 mole) of 2-trichloromethylbenzothiazoline in 400 ml. of ethanol was poured, with agitation, into a solution of 39.0 g. (0.24 mole) of anhydrous ferric chloride in 400 ml. of ethanol. The resulting mixture was freed of ethanol under reduced pressure and treated with a solution of 150 g. of sodium bicarbonate in 1000 ml. of water to neutralize the liberated hydrogen chloride. After standing overnight the mixture was subjected to continuous liquid-liquid extraction with ethyl ether for a period of three days. The ether solution was then dried over sodium sulfate, filtered and evaporated to give 21.3 g. of a brown solid. The crude 2-dichloromethylbenzothiazole was recrystallized from ca. 50 ml. of hexane to give 13.4 g. of crystals, M.P. 64–68° C. A second crop weighed 2.1 g. and brought the total yield to 71.0%. A 13.8 g. charge of the first crop was distilled through a short-path system under reduced pressure to give 11.9 grams of a nearly white solid, B.P. 122–124°/3 mm.

*Analysis.*—Calcd. for $C_8H_5NSCl_2$: C, 44.04; H, 2.31; N, 6.42. Found: C, 44.10; H, 2.48; N, 6.37.

The infrered spectrum included bands at $3.25\mu$ (aromatic C—H) $3.36\mu$ ($Cl_2$C—H), $6.29\mu$ and $6.65\mu$ (aromatic C=C), $12.77\mu$ and $13.82\mu$ ($CCl_2$?). No N—H stretching absorption was observed.

The absence of N—H was confirmed by NMR analysis which showed one hydrogen (—$CCl_2$—H) at a 7.12 p.p.m. singlet and a four hydrogen complex multiplet (benzenoid system) at 7.3–8.2 p.p.m., all in agreement with the assigned structure.

EXAMPLE 2

2-dichloromethylbenzothiazole

To a stirred solution of 29.6 g. (0.21 mole) of dichloroacetyl chloride in 225 ml. of benzene was added a solution of 25.0 g. (0.20 mole) of o-aminobenzenethiol and 15.9 g. (0.21 mole) of pyridine in 100 ml. of benzene over a 20-minute period while maintaining a temperature of 6–16° C. by external cooling. Following the feed, the mixture was stirred successively at 16–20° C. for 10 minutes and finally at 42–50° C. for a period of about one hour.

The reaction mixture was then removed from the flask and the upper organic layer separated, washed with water, and dried over sodium sulfate. Evaporation of the benzene on the steam bath and cooling afforded 38.6 g. (88.6% yield) of 2-dichloromethylbenzothiazole, M.P. 66–68.5° C., undepressed upon admixture with the product of the ferric chloride reaction (Example 1). Recrystallization from hexane raised the M.P. to 70–72° C.

*Analysis.*—Calcd. for $C_8H_5NSCl_2$: N, 6.39. Found: N, 6.57.

The infrared spectrum was in agreement with the assigned structure and identical to that of the 2-dichloromethylbenzothiazole obtained in Example 1.

EXAMPLE 3

2-dichloromethylbenzothiazole

To a stirred solution of 1125 g. (7.63 moles) of dichloroacetyl chloride in 10 liters of benzene was added a solution of 950 g. (7.58 moles) of o-aminobenzenethiol and 605 g. (7.64 moles) of pyridine in 2000 ml. of benzene over a 53 minute period, with external cooling to maintain the temperature at 8–18° C. during the feed period. The temperature was raised to 58–63° C. over a 47-minute period and held at this point for 34 minutes after which the benzene layer was decanted from the mixture and allowed to evaporate to about 4 liters in the hood. The concentrated benzene solution was extracted once with one liter of water and filtered through a benzene-wet paper to give a clear filtrate which was evaporated to give 1518 g. (crude yield of 91.8%) of 2-dichloromethylbenzothiazole, M.P. 64–67° C. Recrystallization from boiling hexane gave 1346 g. (89% recovery) of pure material, M.P. 67–67.5° C. The infrared spectrum of the material was identical to that of an authentic specimen of 2-dichloromethylbenzothiazole.

EXAMPLE 4

2-dichloromethyl-5(or 6)nitrobenzothiazole

A 21.8 g. (0.10 mole) charge of 2-dichloromethylbenzothiazole was nitrated at 46°–101° C. with 9.4 g. (0.105 mole) of concentrated nitric acid and 120 g. of concentrated sulfuric acid using a procedure similar to that described in J. Am. Chem. Soc. 48, 783 (1926). Attempted purification of the sirupy product by crystallization from ligroin yielded four crops of a solid mixture, total weight 3.2 g., and 14.8 g. of an uncrystallizable sirup with an analysis close to that of 2-dichloromethyl-5-(or 6)nitrobenzothiazole.

Analysis.—Calcd. for $C_8H_4N_2SO_2Cl_2$: C, 36.52; H, 1.53; N, 10.65. Found: C, 37.62; H, 1.82; N, 10.33.

The infrared spectrum of the material was virtually identical to that of an authentic specimen of 6-nitrobenzothiazole through the 6μ–9.5μ region.

EXAMPLE 5

5-chloro-2-dichloromethylbenzothiazole

A. 3.18 g. (0.011 mole) charge of 5-chloro-2-trichloromethylbenzothiazoline, contained in a small side-arm flask, was heated at 100–124° C. for a period of 6.5 hrs. (oil bath) under a gentle stream of dry nitrogen. Recrystallization of the crystalline residue from heptane-hexane gave 2.3 g. (82.9% yield) of crude 5-chloro-2-dichloromethylbenzothiazole, M.P. 89–91° C. A second recrystallization from heptane gave 1.45 g. of crystals, M.P. 89.5–91° C.

Analysis.—Calcd. for $C_8H_4NSCl_3$: C, 38.05; H, 1.59. Found: C, 38.28; H, 1.33.

Infrared analysis revealed bands at 3.24μ (arom. C—H), 3.36μ (C—H), 5.31μ and 5.75μ (weak, 1,2,4-trisubs. phenyl) 6.30μ and 6.68μ (arom. C═C), 11.5μ and 12.39μ (1,2,4-trisubs. phenyl), 12.57μ, 13.42μ and 13.6μ (CCl$_2$?) in agreement with the expected structure.

EXAMPLE 6

5-chloro-2-dichloromethylbenzothiazole

To a stirred solution of 15.5 g. (0.105 mole) of dichloroacetyl chloride in 200 ml. of benzene was added, over a 15-minute period, a solution of 19.6 g. (0.1 mole) of 2-amino-4-chlorobenzenethiol hydrochloride in 15.9 g. (0.21 mole) of pyridine followed by a rinse of 50 ml. of benzene, holding the mixture at 9–14° C. during the addition by external cooling. The mixture was stirred at 0–10° C. for an additional period of 5 minutes and then stirred at 40–50° C. for one hour.

The two liquid layers were separated and the benzene (upper) phase was washed with 2×200 ml. of water, dried over sodium sulfate and freed of benzene by evaporation to give a liquid which crystallized on cooling. Two recrystallizations of the crude product (wt. 12.4 g.) from heptane (darco treatment employed) gave, upon chilling to −70° C. in a $CO_2$ acetone bath, 3.65 g. (14.5% yield) of pure 5-chloro-2-dichloro methylbenzothiazole as white crystals, M.P. 90.5–91° C.

Analysis.—Calcd. for $C_8H_4NSCl_3$: C, 38.05; H, 1.59. Found: C, 38.60; H, 1.61.

The infrared spectrum was identical to that obtained for the material produced by dehydrochlorination route (Example 5) and the mixed M.P. with the previously-prepared material was 90.5–92.5° C.

EXAMPLE 7

2-dichloromethyl-5-trifluoromethylbenzothiazole

To a stirred solution of 74 g. (0.5 mole) of dichloroacetyl chloride in 200 ml. of benzene was added, portionwise, 38.7 g. (0.2 mole) of 2-amino-4-trifluoromethylbenzene thiol over a 1.1-hour period with gentle cooling to maintain a maximum temperature of 40° C. The reaction mixture was then heated to reflux (78–84° C.) and stirred for an additional 2 hour period.

Following removal of a solid impurity by filtration evaporation of the filtrate left a sirup which was redissolved in 100 ml. of benzent, washed with 3× 100 ml. of water and the solution dried over sodium sulfate. The solvent was removed on the steam bath to give a liquid residue, weight 29.2 g., which crystallized on standing. Recrystallization from hexane (cooling to −80° C.) afforded 22.5 g. 39.3% yield) of relatively pure 2-dichloromethyl-5-trifluoromethylbenzothiazole, M.P. 29–33° C. Recrystallization from hexane gave 17.7 g. of pure material, M.P. 34–34.5° C.

Analysis.—Calcd. for $C_9H_4NSCl_2F_3$: C, 37.78; H, 1.41; N, 4.89. Found: C, 37.88; H, 1.67; N. 4.75.

The infrared spectrum of the material was in agreement with the proposed structure.

EXAMPLE 8

4-chloro-2-dichloromethylbenzothiazole and 4,6-dichloro-2-dichloromethylbenzothiazole A 1.0 mole (127.6 g.) charge of o-chloroaniline was fed, with stirring, to 1485 g. (11 moles) of sulfur monochloride after which the mixture was stirred at about 75° C. for approximately 22 hours during which hydrogen chloride was given off. The solid reaction product, after washing with benzene and drying, weighed 210.3 g. A 191 g. charge of the material was then converted to the corresponding benzothiazathionium hydroxide by stirring with 1000 ml. of water for a 4-day period. The resulting purple solid weighed 334.2 g. upon drying and melted at 96.5–97.5° C.

A solution of 400 g. (10 moles) of sodium hydroxide and 56 g. (1 mole) of sodium hydrosulfide in 2000 ml. of water was stirred under a nitrogen atmosphere and to this was added 317.8 of the above-prepared hydrate. The mixture was stirred under nitrogen with warming at 40° C. for about 4.5 hours after which it was suction-filtered. The amino mercaptan products were recovered from the filtrate by adjusting to pH 5 and ether extracting. Evaporation of ether from the dried extract left a red oil which, upon vacuum distillation gave 30.3 g. of distillate, which formed a solid, M.P. 54–59° C., and left 64.2 g. of black residue, M.P. 61–92° C.

A 29.7 g. portion of the distilled solid from above was reacted with dichloroacetyl chloride and pyridine in benzene in the previously-described manner. Working up the reaction mixture gave 23:5 g. of a product, M.P. 86.5–113° C. Crystallization from boiling heptane failed to effect any fractionation but recrystallization from hexane gave 4. 6 g. of insoluble residue, M.P. 126–129° C. and 14.2 g. of material separating as crystals, M.P. 106.5–117° C. with a 2.0 g. second crop, M.P. 107–112° C. Recrystallization of the 14.2 g. crop from hexane gave 7.2 g. of crystals, M.P. 107–110° C., and left 4.0 g. of residue, M.P. 128–129° C., which proved identical to the original 4.6 g. residue by mixed melting point. These residues were combined and recrystallized, successively, from toluene and from ethanol to give 3.5 g. of crystals, M.P. 129.5–130.5° C. Infrared analysis of the latter indicated the presence of two dichloromethylbenzothiazoles and was in agreement with a mixture of the 4-chloro derivative containing the 4,6-dichloro derivative as the minor constituent. The following analysis was determined for a presumed 77%–23% mixture of the 4-chloro and 4,6-dichloro derivatives of 2-dichloromethylbenzothiazole.

*Analysis.*—Calcd.: C, 37.00; H, 1.47, Cl, 43.80. Found: C, 37.29; H, 2.05; Cl, 44.29.

The material, M.P. 107–112° C., from above possessed an NMR spectrum in general accordance with 4,6-dichloro-2-dichloromethylbenzothiazole with bands assigned as follows: singlet (1H of CHCl$_2$), 7.01 p.p.m.; doublet (1H at position 7 of benzene ring), 7.52 p.p.m.; doublet (1H at position 5 of the benzene ring) 7.77 p.p.m. This fraction proved identical to the material (7.2 g.) M.P. 107–119° C., by mixed melting point. The two were then combined and recrystallized from hexane to give 5.5 g. of crystals, M.P. 108–111° C. Infrared analysis of the latter supported the NMR-indicated presence of 4,6 - dichloro - 2 - dichloromethylbenzothiazole, but also showed the 4-monochloro isomer of the 129.5–130.5° C. M.P. mixture present as a minor constituent. Further recrystallization from ethanol failed to change the melting point from 108.5–111° C. and the following analysis was determined for a presumed 25%–75% mixture of the 4-chloro and 4,6-dichloro derivatives of 2-dichloromethylbenzothiazole.

*Analysis.*—Calcd.: C, 34.62; H, 1.19; Cl, 47.60. Found: C, 34.83, H, 1.25; Cl.47.01.

EXAMPLE 9

6-chloro-2-dichloromethylbenzothiazole

A mixture of 12.8 g. (0.08 mole) of 2-amino-5-chlorobenzenethiol and 6.4 g. (0.081 mole) of pyridine in 75 ml. of benzene was fed, with stirring, to a solution of 11.9 g. (0.081 mole) of dichloroacetyl chloride in 150 ml. of benzene over a 33-minute period, at 3–11° C. The reaction was completed by heating at 60° C. for one hour after which the benzene solution was water-washed, dried (Na$_2$SO$_4$) and evaporated to give 18.1 g. of very crude product. This was crystallized from hexane to give 9.8 g. of 6-chloro-2-dichloromethylbenzothiazole, M.P. 72–76° C. A second crop of 2.1 g., M.P. 60–70° C. brought the crude yield, based on the amino thiol, to 59%. Recrystallization of the first crop from hexane gave 5.7 g. of pure material, M.P. 77–79° C.

*Analysis.*—Calcd. for C$_8$H$_4$NSCl$_3$: C, 38.05; H, 1.59; N, 5.55. Found: C, 37.89; H, 1.77; N, 5.52.

Both the IR and NMR spectra of the product were compatible with 6-chloro-2-dichloromethylbenzothiazole. A mixed melting point with 5-chloro-2-dichloromethylbenzothiazole (M.P. 91–92.5° C.) was depressed to 57–69.5° C. confirming their non-identity.

EXAMPLE 10

2-dichloromethylbenzothiazole by pyrolysis of 2-trichloromethylbenzothiazoline

A 5.0 g. (.0197 mole) charge of 2-trichloromethylbenzothiazoline was placed in a flask with a nitrogen inlet and a side arm leading to a train of two traps cooled, successively by ice-water and Dry Ice-acetone mixtures. With a gentle stream of dry nitrogen flowing through the system, the pyrolysis flask was heated by a steam bath causing the charge to melt with evolution of HCl. After a 10-hour heating period the HCl production had virtually ceased and a 0.49 g. (68% of theory) weight loss in the residue (which crystallized on cooling) was noted. Recrystallization from hexane gave 2.3 g. (53.3% yield) of impure 2-dichloromethylbenzothiazole, M.P. 51.5–65.5° C., undepressed by admixture with pure material.

*Analysis.*—Calcd. for C$_8$H$_5$NSCl$_2$: N, 6.42; Cl, 32.50. Found: N, 6.03; Cl 33.61.

This discrepancy in combustion analysis was explained by infrared analysis which revealed the presence of some undecomposed starting material in the 2-dichloromethylbenzothiazole.

EXAMPLE 11

2-dichloromethylbenzothiazole by pyrolysis of the dimer of 2-trichloromethylbenzothiazoline A 0.22 g. (0.000433 mole) sample of the dimer of 2-trichloromethylbenzothiazoline was heated in a gentle stream of dry nitrogen at 152–160° C. for a period of approximately one hour using the apparatus described in Example 10. At this time HCl evolution, which had been vigorous, had nearly ceased. A total of 0.10 g. (53.0% yield) of 2-dichloromethylbenzothiazole, M.P. 64.5–68.5° C. was recoverd as a white crystalline sublimate from the walls of the pyrolysis vessel. The mixed melting point with authentic material was undepressed.

EXAMPLE 12

5 (or 6)-bromo-2-dibromomethylbenzothiazole

Bromine (80 g., 0.5 mole) was added to a cooled (13° C.) stirred mixture of 14.9 g. (0.1 mole) of 2-methylbenzothiazole, 50 ml. of acetic anhydride, 30 g. of anhydrous sodium acetate and 200 ml. of glacial acetic acid and when no pronounced temperature kick was noted, the mixture was heated to 87–90° C. where it was held for 40 minutes at which time the bromine, continuously returned to the mixture by a Dry Ice-acetone reflux condenser, had undergone virtually complete reaction.

The reaction mixture was partitioned between a mixture of water and ethyl ether-ligroin, the latter giving, after further washing, drying and evaporation 33.3 g. of a partially dry, dark solid. Recrystallization from heptane gave 11.7 g. of a solid, M.P. 65–110° C. When this was washed with petroleum ether and the ether evaporated, 0.3 g. of solid, M.P. 76–79° C. remained which possessed an analysis close to that of a tribromo methylbenzothiazole.

*Analysis.*—Calcd. for C$_8$H$_4$NSBr$_3$: C, 24.89; H, 1.05. Found: C, 25.37; H, 1.42.

Both infrared and NMR analysis indicated the product was 5 (or 6)-bromo-2-dibromomethylbenzothiazole. The NMR spectrum with assignments was as follows: 6.95 p.p.m. (singlet, —CHBr$_2$), 7.5–8.05 p.p.m. (complex multiplet, 3 aromatic hydrogens).

Other representative 2 - dihalomethylbenzothiazoles within this invention and which can be prepared in a similar manner to that shown in the foregoing examples are:

2-dichloromethylbenzothiazole,
2-dichloromethyl-5-nitrobenzothiazole,
2-dichloromethyl-6-nitrobenzothiazole,
4-chloro-2-dichloromethylbenzothiazole,
5-chloro-2-dichloromethylbenzothiazole,
6-chloro-2-dichloromethylbenzothiazole,
7-chloro-2-dichloromethylbenzothiazole,
5,7-dichloro-2-dichloromethylbenzothiazole,
4,6-dichloro-2-dichloromethylbenzothiazole,
2-dichloromethyl-5-methylbenzothiazole,
2-dichloromethyl-6-n-butylbenzothiazole,
6-chloro-2-dichloromethyl-5-methylbenzothiazole,
4,6-dichloro-2-dichloromethyl-5-methylbenzothiazole,
4,6-dichloro-2-dichloromethyl-5-ethylbenzothiazole,
4-chloro-2-dichloromethyl-6-nitrobenzothiazole,
2-dichloromethyl-5-trifluoromethylbenzothiazole,
2-dibromomethylbenzothiazole,
5-acetamido-2-dibromomethylbenzothiazole,
6-acetyl-2-dibromomethylbenzothiazole,
5-chloro-2-dibromomethylbenzothiazole,
2-dibromomethyl-6-nitrobenzothiazole,
2-dibromomethyl-6-methoxybenzothiazole, 4-chloro-2-dibromomethyl-6-phenylbenzothiazole,
2-difluoromethylbenzothiazole, ness of several benzothiazoles, No. (1) being the only benzothiazole within the purview of this invention.

TABLE I.—COMPARATIVE NEMATOCIDAL EFFECTIVENESS OF SEVERAL BENZOTHIAZOLES

| No. | Structure | Name | Test No. | Root-knot, 38 lbs./acre | Nematode, 19 lbs./acre | Toxicity rating, 9.5 lbs./acre |
|---|---|---|---|---|---|---|
| (1) | (benzothiazole-CHCl$_2$) | 2-dichloro-methyl-benzothiazole. | A | 5 | 5 | 3 |
|  |  |  | B | 5 | 5 | 5 |
| (2) | (benzothiazole-CH$_3$) | 2-methyl-benzothiazole. | A | 1 | 2 | 2 |
|  |  |  | B | 1 | 1 | 1 |
| (3) | (benzothiazole-Cl) | 2-chloro-benzothiazole. | A | 4 | 2 | 2 |
|  |  |  | B | 3 | 4 | 1 |
| Untreated control | | | | 2 | Reference standard | |
| Nemagon | | | A | 4 | 1 | |
|  | | | B | 5 | 5 | 2 |

6-cyano-2-difluoromethylbenzothiazole,
5-bromo-7-cyano-2-difluoromethylbenzothiazole,
6-amino-5-(2-butenyl)-2-difluoromethylbenzothiazole,
2-difluoromethyl-5-phenylthiocarbonylbenzothiazole,
2-diiodomethylbenzothiazole,
4-bromo-6-carboxy-2-diiodomethylbenzothiazole,
4,6-dipropionyl-2-diiodomethylbenzothiazole,
2-diiodomethyl-5-fluoro-7-formylbenzothiazole,
2-difluoromethyl-4-ethyl-6-n-propoxycarbonylbenzothiazole,
6-bromo-2-dibromomethylbenzothiazole,
5-bromo-2-dibromomethylbenzothiazole,
2-chlorofluoromethylbenzothiazole,
2-bromochloromethylbenzothiazole; and the like.

The 2-dihalomethylbenzothiazoles of this invention find particular application in the agricultural field as pesticides and are effective as bactericides. Several are nematocidally-active and are therefore particularly useful as nematocides. Although several of the 2-dihalomethylbenzothiazoles of this invention show pronounced nematocidal activity, their use is, as a class, not limited thereto. They show a broad spectrum of pesticidal activity, as a class, in addition to the pronounced degree of nematocidal activity shown by some of the members. As a class, they display bactericidal, herbicidal, fungicidal, insecticidal, and miticidal activity in addition to nematocidal activity.

As representative of the pesticidal activity of the 2-dihalomethylbenzothiazoles of this invention, 2-dichloromethylbenzothiazole has shown potent activity as a nematocide as well as activity as a soil fungicide; 5-chloro-2-dichloromethylbenzothiazole has shown promising performance as a mite ovicide, as well as pesticidal activity against army worm; 6-chloro-2-dichloromethylbenzothiazole is also active as a nematocide; and 2-dichloromethyl-5-trifluoromethylbenzothiazole has shown good promise as a bactericide and as a foliar fungicide.

The 2-dichloromethylbenzothiazole of this invention has demonstrated a nematocidal potency of ED$_3$ at 4.8 pounds per acre compared with an ED$_3$ at 15 pounds per acre for the reference standard Nemagon. As used herein, the term ED$_3$ is a given concentration of benzothiazole which will elicit a rating of "3" (light galling) on a scale of from "1 to 5," said scale to be defined hereinafter. Also as used herein, the term ED$_3$ is for all practical purposes synonymous with the well-known term LD$_{50}$.

Table I, infra, shows comparative nematocidal effectiveness of several benzothiazoles, No. (1) being the only benzothiazole within the purview of this invention.

With reference to Table I, supra, the nematocidal toxicity rating numbers (1–5) have the following meanings:

1 = severe galling; equal to untreated control
2 = moderate galling
3 = light galling
4 = very light galling
5 = no galling Again, with reference to Table I, infective migratory larvae of the root-knot nematode, Meloidogyne incognita var. acrita were reared in the greenhouse on roots of Rutgers variety tomato plant. Infected tomato plants were removed from the culture and the roots were chopped very finely. A small amount of inoculum from the roots was added to pint Mason jars containing approximately 180 cc. of soil. The jars containing the inoculum and soil were capped and incubated for one week at room temperature. During this period eggs of the nematode hatched and the larvae forms migrated into the soil. Ten milliliters of the test formulation was added to each of two jars for each dosage treated. Following the addition of the benzothiazole, the jars were capped and the contents thoroughly mixed on a ball mill for 5 minutes. The benzothiazoles were formulated by a standard procedure of solution in acetone, addition of an emulsifier and dilution with water. The tests of Table I were run at 5.0 mg., 2.5 mg. and 1.25 mg. of benzothiazole per jar which is approximately 38 lbs., 19 lbs. and 9.5 lbs. per acre, respectively. The jars remained capped at room temperature for a period of 48 hours and the contents were then transferred to 3 inch pots. Subsequently, the pots were seeded to cucumber as an indicator crop and placed in the greenhouse where they were cared for in the normal fashion for growing potted cucumber for approximately three weeks. These cucumber plants were then removed from the pots, the soil washed from the roots and the amount of galling visually rated using the aforementioned numbers (1–5), with their hereinabove ascribed meanings.

It can be seen from Table I, that 2-dichloromethylbenzothiazole No. (1), is a far superior nematocide to 2-methylbenzothiazole No. (2) and/or 2-chlorobenzothiazole No. (3). These comparative results show that in test No. (B), 2-dichloromethylbenzothiazole [No. (1)] at 38 pounds/acre, 19 pounds per acre, and 9.5 pounds per acre was the only benzothiazole that completely prevented galling ("5" on the scale). No galling was found in test No. (B) using 2-dichloromethylbenzothiazole [No. (1)], compared to severe galling using 2-methylbenzothiazole [No. (2)] in test No. (B), and severe galling to very light galling using 2-chlorobenzothiazole [No. (3)] in test No. (B). It is believed that the high toxicity ratings for 2-dichloromethylbenzothiazole [No. (1)] in Table I, shows that this benzothiazole is a more potent nematocide than the other two benzothiazoles tested.

Comparative test data has also shown that 2-(1,1-dichloroethyl)benzothiazole (Mizuno et al. supra) is inactive as a nematocide. In a dose rate greater than ten times that of 2-dichloromethylbenzothiazole giving good control of nematodes, 2-(1,1-dichloroethyl)benzothiazole was inactive as a nematocide.

The benzothiazoles contemplated in this invention may be applied as insecticides, miticides, fungicides, bactericides, herbicides, and nematocides according to methods known to those skilled in the art. Pesticidal compositions containing the benzothiazoles as the active toxicant will usually comprise a carrier or diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fullers earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier diluent or in from about 5 to 500 pounds of inert solid carrier or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

What is claimed is:

1. Nematocidal composition comprising a nematocidally acceptable carrier and, as an active toxicant, nematocidally effective amounts of a benzothiazole of the formula:

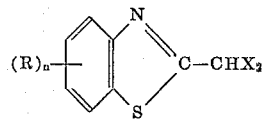

wherein R is selected from the group consisting of hydrogen, halogen, nitro, trihalomethyl, and alkyl, of from 1 to 12 carbon atoms; X is a halogen; and $n$ is an integer from 0 to 4, inclusive.

2. The method of combating nematodes which comprises subjecting the nematodes to a nematocidally effective amount of 2-dichloromethylbenzothiazoles of the formula:

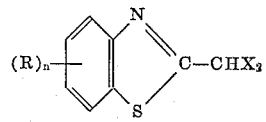

wherein R is chlorine, and $n$ is an integer of from 0 to 4, inclusive.

References Cited

UNITED STATES PATENTS 2,932,649   4/1960   Metivier.
2,985,661   5/1961   Hein et al.

FOREIGN PATENTS 1,035,959   8/1958   Germany.

OTHER REFERENCES

Mizuno et al.: Pharmaceutical Society of Japan, Journal of; 1952; vol. 72; pp. 1263–1265.

ALBERT T. MEYERS, Primary Examiner

D. R. MAHANAND, Assistant Examiner

U.S. Cl. X.R.

71—90; 260—304